United States Patent [19]

Shay et al.

[11] 4,214,886
[45] Jul. 29, 1980

[54] FORMING LAMINATED SHEET GLASS

[75] Inventors: George C. Shay, Corning, N.Y.; Raphael A. Simon, Avondale Estates, Ga.

[73] Assignee: Corning Glass Works, Corning, N.Y.

[21] Appl. No.: 27,497

[22] Filed: Apr. 5, 1979

[51] Int. Cl.² .......................................... C03B 17/00
[52] U.S. Cl. ....................................... 65/121; 65/145
[58] Field of Search ............................ 65/121, 145, 53

[56] References Cited

U.S. PATENT DOCUMENTS

| | | | |
|---|---|---|---|
| 1,734,964 | 11/1929 | Danner | 65/121 X |
| 2,992,517 | 8/1961 | Hicks, Jr. | 65/3 A |
| 3,218,143 | 11/1965 | De La Jarte | 65/90 |
| 3,338,696 | 8/1967 | Dockerty | 65/145 |
| 3,519,411 | 7/1970 | Cortright et al. | 65/90 |
| 3,523,778 | 8/1970 | Robinson | 65/121 X |
| 3,582,306 | 6/1971 | Giffen | 65/121 |
| 3,673,049 | 6/1972 | Giffen et al. | 65/121 X |
| 3,737,294 | 6/1973 | Dumbaugh, Jr. et al. | 65/121 X |
| 3,791,806 | 2/1974 | Koizumi et al. | 65/121 X |
| 4,018,965 | 4/1977 | Kerko et al. | 428/410 |

Primary Examiner—Arthur D. Kellogg
Attorney, Agent, or Firm—John P. DeLuca; Burton R. Turner

[57] ABSTRACT

A first molten glass of one composition is caused to flow downwardly along converging flow paths of a forming member while simultaneously at least one other molten glass of a different composition is flown downwardly along outer surface portions of the first glass such that said glasses are in molten contact with one another during their downward travel and are then continuously formed into a composite or laminated glass sheet. The molten glasses are distributed to the forming member in such a manner as to provide substantially uniform thickness of the glass layers across the newly formed sheet, and various viscosity, glass flow rates and proportionate layer thicknesses may be obtained by varying the degree of tilt of the forming member.

12 Claims, 6 Drawing Figures

FORMING LAMINATED SHEET GLASS

BACKGROUND OF THE INVENTION

The formation of laminated glass articles is broadly known in the art including the formation of laminated fibers by means of downward flow through concentric orifices as shown in U.S. Pat. Nos. 2,992,517 and 3,791,806. The formation of laminated sheet glass such as disclosed in U.S. Pat. Nos. 3,673,049 and 3,737,294 is also known, and includes the use of a laminated feeder orifice as shown in U.S. Pat No. 3,582,306, updraw lamination as shown in U.S. Pat. No. 3,218,143, and over-the-lip downdraw processes as shown in U.S. Pat. No. 1,734,964.

The reasons for developing a laminated sheet glass process include: improved strength, desired optical properties, cost reduction and weight reduction. Generally, the impetus for providing laminated sheet glass has been the inability to obtain a combination of desired properties in a single glass composition which is suitable for forming sheet glass for use in a desired end product.

Of major concern in the production of sheet glass, in addition to achieving necessary strength, is the obtainment of acceptable optical quality and thickness uniformity across the width thereof, which in the case of laminated sheet involves the thickness uniformity of each layer. Further, optical quality of the finished sheet glass is materially enhanced during the feeding and forming operations by providing free or virgin glass surfaces which are not in contact with the delivery or forming means, thus providing a virtually defect free optical quality surface. The concentric and laminating orifice discharge devices, on the other hand, being in direct contact with the glass flow, have the disadvantage of imparting boundary discontinuity or other defects to the surface of the laminated glasses flowing through such orifices, whereas similar surface discontinuities are also imparted to one surface of the over-the-lip delivered glass, which surface usually results in the outer optical surface when such glass is delivered to a forming member. Accordingly, such orifice and over-the-lip deliveries do not produce optimum optical quality. In addition, the updraw delivery, although providing good optical surface quality, does not provide the necessary means for achieving thickness uniformity of the various laminates across the width of the drawn sheet.

It thus has been an object of the present invention to provide a method and apparatus for laminating a plurality of glasses whose compositions impart specific attributes to the composite so formed and controlling the thickness of each glass layer across the width of the sheet while providing optical quality surfaces as formed.

SUMMARY OF THE INVENTION

In its simplest form, the invention relates to method and apparatus for laminating or layering hot fluid glasses into a composite or laminated sheet form by using a controllable overflow distribution system and a forming member upon which the core or base layer and skin or superpositioned molten glass layers flow concurrently until they cool to a viscosity suitable for forming a single composite sheet of glass with the desired thicknesses.

At least two glasses of different compositions, which when in laminated combination have the desired properties for the composite, are separately melted. Each of the glasses is then delivered through an appropriate delivery system to an overflow distributor. The distributors are mounted one above the other so that the glass from each flows over top edge portions of the distributor and down at least one side to form a uniform flow layer of appropriate thickness on one or both sides of the distributor below such top edge portions.

The bottom distributor has a wedge-shaped forming member associated therewith having converging sidewall portions which communicate at their top end with the sidewalls of said distributor and terminate at their converging bottom ends in a draw line. The molten glass overflowing the bottom distributor flows downwardly along the distributor walls and forms an initial glass flow layer adjacent to the converging outer surfaces of the forming member, whereas the molten glass overflowing the distributor thereabove flows downwardly over the upper distributor walls and flows over outer surface portions of the initial layer. The two individual layers of glass from each converging sidewall of the forming member are brought together and fused at the draw line to form a single continuously laminated sheet. The central glass in a two-glass laminate is called the core glass, whereas the glasses flowing down the external surface of the core glass are called skin glasses. When three or more separate glasses are utilized, those glasses which are formed intermediate the core and skin glasses are known as either central or embedded glasses.

The overflow distributor process provides a fire polished surface to the sheet glass so formed, and the uniformly distributed thickness of the glass provided by the controlled distributor, provides a glass sheet with superior optical quality.

DESCRIPTION OF THE PREFERRED EMBODIMENTS

Figure 1:
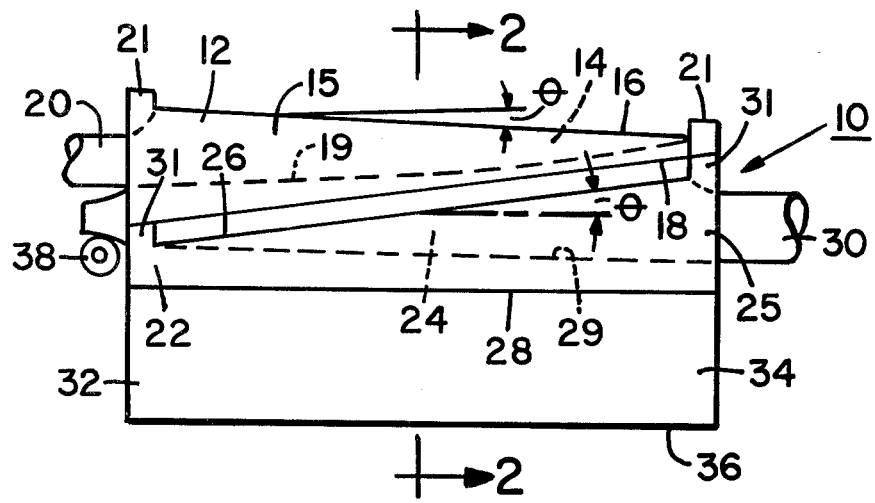
FIG. 1 is a somewhat schematic side elevational view of a preferred embodiment of a distributor apparatus for forming laminated sheet glass in accordance with the present invention.
Figure 2:
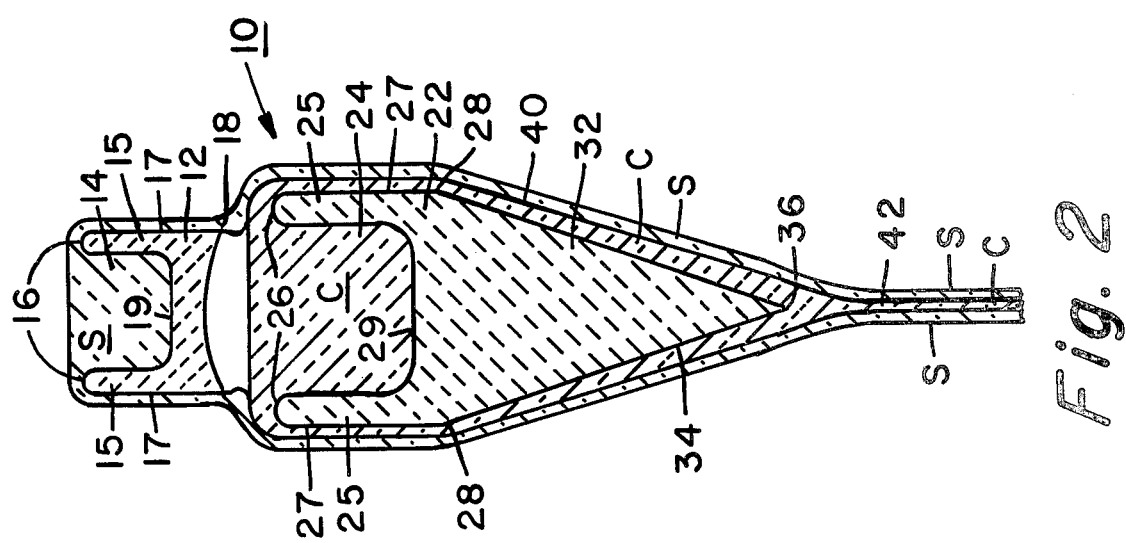
FIG. 2 is an elevational view in section taken along line 2—2 of FIG. 1, showing the flow of molten glass thereover in accordance with the present invention.

Referring now to FIGS. 1 and 2, a preferred embodiment of apparatus 10 for forming laminated sheet glass is shown. The apparatus 10 includes an upper distributor 12 positioned centrally over a lower distributor 22. The upper distributor member 12 has a channel 14 formed longitudinally therealong bounded by sidewalls 15 having longitudinally linearly extending upper dam or weir surfaces 16 and outer sidewall surfaces 17 which terminate at their lower ends 18 in spaced relation above the lower distributor member 22. The channel 14 has a sloping bottom surface 19, which tapers upwardly from an inlet end of the distributor fed by a glass delivery pipe 20, to the weir surfaces 16 at the opposite end of the distributor. A pair of end dams 21 extend across channel 14 and limit the longitudinal extent of the overflow therefrom.

The lower distributor member 22 is also provided with an upwardly open longitudinally extending overflow channel 24 bounded by sidewalls 25 having longitudinally extending linear upper weir or dam surfaces 26 and substantially vertical outer sidewall surfaces 27. The channel 24 is provided with a sloping bottom surface 29 which extends upwardly from an inlet end provided with a glass delivery pipe 30 to the upper weir surfaces 26 at the opposite end of the distributor 22. A pair of end dams 31, which extend across the ends of overflow channel 24, not only confine the longitudinal flow over weir surfaces 26 but also provide a minimum space between the bottom edges 18 of the outer sidewall surfaces 17 of upper distributor 12 and the upper weir or dam surfaces 26 of lower distributor 22 so as to allow for the overflow of glass from the lower distributor. Since the upper and lower distributors are independently supported, they may be adjusted relative to each other as desired. It will be noted that the lower edges 18 of the sidewalls 15 of upper distributor 12 are substantially parallel to the upper weir surfaces 26 of the lower distributor 22.

The lower distributor 22 has a wedge-shaped sheet glass forming member portion 32 provided with a pair of downwardly converging forming surfaces 24 which communicate at their upper ends with the lower ends 28 of outer sidewall surfaces 27, and convergingly terminate at their lower end in a root portion or draw line 36. The distributor members may be supported by any desired means known in the art such as shown in U.S. Pat. No. 3,519,411. However, for flow control reasons which will become more apparent hereinafter, the apparatus 10 is mounted so as to be tiltable about an axis perpendicular to a vertical plane bisecting the overflow channels 14 and 24 of upper distributor 12 and lower distributor 22, respectively, and such tilting action or pivotal adjustment may be provided by any suitable means such as an adjustable roller, wedge mechanism, screw jacks, or cam means 38 to provide a desired tilt angle $\Theta$ between the upper weir or dam surfaces and the horizontal.

The overflow channel of each distributor is formed with a predetermined prescribed relationship such that the glass flow rate, Q, supplied to the channel times the viscosity of the glass, $\eta$, divided by the tangent of the angle of tilt between the plane of the two weir surfaces of the channel and the horizontal, $\Theta$, is equal to a constant, K, which is necessary to produce uniform thickness across the width of the sheet glass. Thus, the overflow channel portion of each weir has the relationship:

$$Q\eta/\tan\Theta = K$$

wherein the glass flow rate, Q, supplied to the trough may be varied by any suitable flow control means, the viscosity, $\eta$, of the glass may be controlled by temperature, and the angle of tilt, $\Theta$, between the plane of the weir surfaces and the horizontal may be varied by suitable adjustable means. It thus can be seen, that the rate of flow, the viscosity of the glass, and the angle of tilt may be varied over fairly wide limits and still produce the desired constant K, which is necessary to form both the core and skin glasses with uniform thickness. Preferably, a predetermined value of $\Theta$ is built into the distributor as formed so that the upper dam or weir surfaces are provided with an initial value of $\Theta$ of between about 1° and 7°. Although we have opted to use the same initial value of $\Theta$ for both the upper and lower distributors, differing values of $\Theta$ may be utilized for such distributors if desired. Preferably, the lower edges of the sidewalls of the upper distributor are formed with an angle which will complement the initial value of $\Theta$ utilized for the overflow channel of the lower distributor so that the upper dam or weir surfaces of the channel of the lower distributor are substantially parallel to the lower edges of the outer side wall surfaces of the upper distributor. The draw line or root of the forming portion of the lower distributor is maintained substantially horizontal when providing the initial value of $\Theta$ for its associated overflow channel.

Figure 1A:
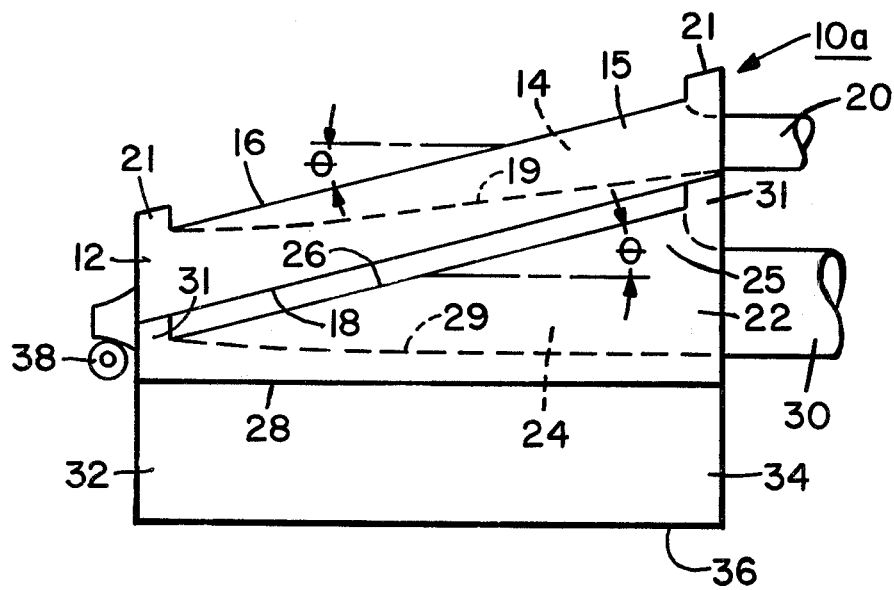
FIG. 1a is a further embodiment of such apparatus.

Referring now to FIG. 1a, it will be noted that the embodiment of the apparatus 10a is identical to the apparatus 10 shown in FIG. 1, except for the fact that the upper distributor 12 is reversed, so that the feed end of channel 14 and the feed end of channel 24 are on the same side of the apparatus rather than opposite sides as shown in FIG. 1. However, keeping in mind the flow rate/viscosity/tilt angle relationship built into each overflow channel, the embodiment of FIG. 1 is preferred due to the greater flexibility which can be obtained. That is, as the apparatus 10 of FIG. 1 is tilted or rotated in a counterclockwise direction, the value of the angle $\Theta$ for the upper distributor 12 will decrease whereas the value of the angle $\Theta$ for the lower distributor 22 will increase. Accordingly, while maintaining uniform sheet glass thickness from each distributor, a higher viscosity core glass may be distributed by the lower distributor 22 and a lower viscosity skin glass may be distributed by the upper distributor 12. In a like manner, when the apparatus 10 is tilted or rotated in a clockwise direction, the value of $\Theta$ for the upper distributor 12 is increased whereas the value of $\Theta$ for the lower distributor 22 is decreased. Accordingly, a lower viscosity core glass may be distributed by the lower distributor 22 and a higher viscosity skin glass may be distributed by the upper distributor 12.

Not only may the viscosity be varied in order to compensate for a change in tilt angle, but also the flow rate of the delivered glass may be varied and thus the thickness of the individual layers. Thus, since the viscosity ratio between two desired glass compositions is fixed for a given operating temperature, the flow rate and accordingly the thickness of the skin and core glasses may be varied and controlled by adjusting the degree of tilt on one or both of the distributors. In fact, a key advantage of using the preferred apparatus is the ability to be able to control the thickness of the individual glass layers independently of the other.

In the operation of the apparatus shown in FIGS. 1 and 2, molten core glass C is delivered to the inlet end of channel 24 by means of glass delivery pipe 30. A low effective head of the core glass C is maintained and accordingly the molten material flows ino the channel 24 without surge or agitation. The molten glass then wells upwardly over the parallel upper dam or weir surfaces 26 of the channel 24, divides, and flows down the outer side surfaces 27 of each sidewall 25, and then flows downwardly along each of the oppositely disposed converging forming surfaces 34 of the sheet glass forming member portion 32. Simultaneously, molten skin glass S is delivered to the inlet end of channel 14 by means of glass delivery pipe 20 wherein the molten material wells over the parallel upper dam or weir surfaces 16 of the channel 14, divides, and flows down each outer sidewall surface 17 of the sidewalls 15 and onto the upper surface of the core glass, C, wherein it flows downwardly along outer surface portions 40 of the core glass C. At the bottom of the wedge-shaped sheet forming member portion 32, the separate laminated flows rejoin to form a single composite or laminated sheet 42 having a central core C and a layer of skin glass S on each side. The outer surfaces of the laminated sheet 42 are virgin surfaces of fire-polished surface quality, since the upper free surface of the skin glass S within the channel 14 divides and flows downwardly over the opposed outer sidewall surfaces 17 and core glass C, thus forming the exterior surfaces of the sheet 42 without having come in contact with the distributor or forming device.

Figure 3:
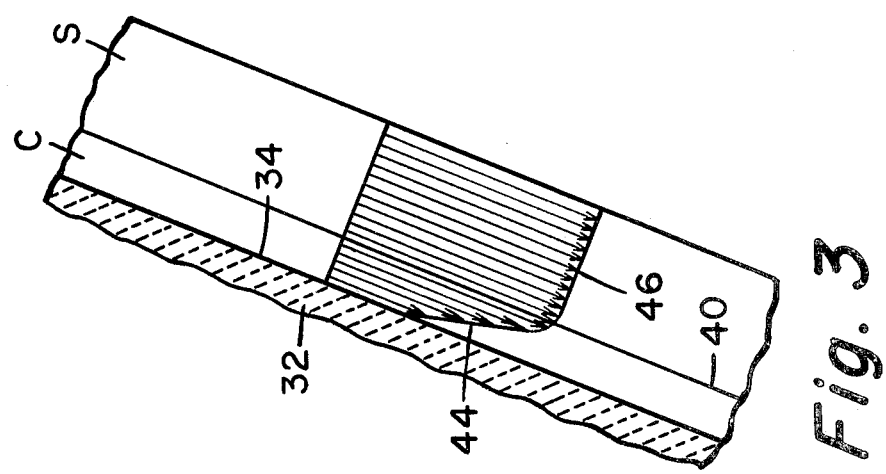
FIG. 3 is an enlarged fragmental schematic view of a particular flow along a forming surface of FIG. 2.

From a process point of view, the laminated sheet glass delivery of the present invention offers a potential for forming devitrifiable glasses or glass-ceramics in sheet form by placing a thin, fluid core glass layer between the forming member and the devitrifiable skin glass, so as to obtain essentially slug flow of the skin glass, and thereby move such glass through the devitrification temperature range in less time than is required for devitrification to occur. In a single glass delivery system, flow on the side of the forming member is laminar, and accordingly the glass adjacent the forming member has a long residence time such that a devitrifiable glass would in fact devitrify during its movement along the forming member. The slug flow concept is schematically shown in the enlarged fragmental view of FIG. 3 wherein a relatively thin layer of fluid core glass C is shown flowing downwardly along a forming surface 34 of forming member portion 32. Due to the drag or resistance to glass flow generated along surface 34, the core glass C has a laminar flow front profile 44, which illustrates the increased residence time of the glass closer to the surface 34. Further, the skin glass S which flows along the outer surface 40 of the core glass C has a flat or slug-type profile 46 which permits the outer skin glass to flow downwardly along the forming member and to be drawn into laminated sheet 42 prior to the devitrification of the skin glass S. In essence, since the core glass is of a much lower viscosity than the skin glass, it functions as a lubricant for the skin glass relative to the forming member, thus facilitating the slug flow of the skin glass.

Figure 4:
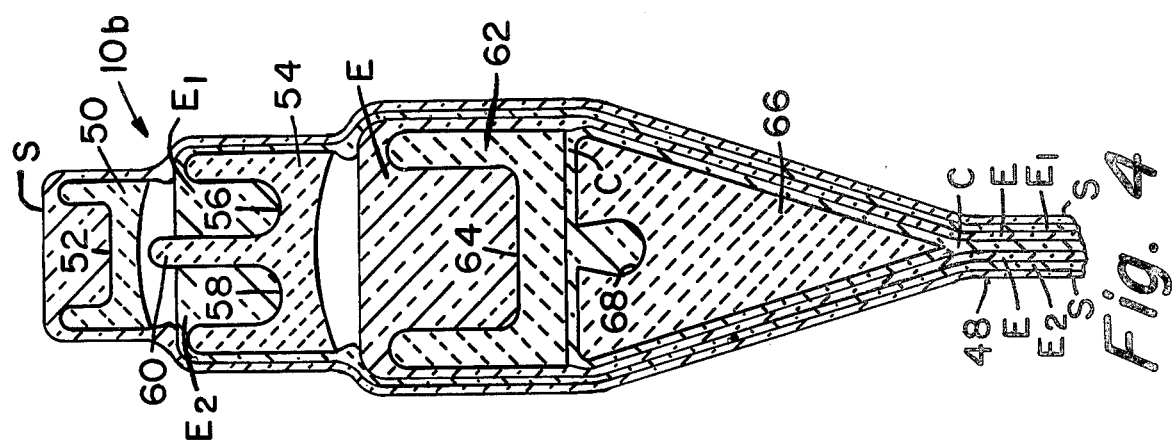
FIG. 4 is an elevational view in section of a further embodiment.

Referring now to FIG. 4, a rather elaborate forming apparatus 10b is shown for forming a seven layer glass sheet composite 48 comprising a central core C, a first layer of embedded glass E on each side of said core, a layer of different embedded glasses $E_1$ and $E_2$ on opposite sides of said first layer of embedded glass, and a layer of skin glass S overlying said second layers of embedded glass.

The uppermost distributor member 50 has a channel 52 from which skin glass S overflows and runs down opposite sides to form a skin on embedded glass overflowing distributor 54 therebelow. The distributor 54 is shown having two overflow channels 56,58 divided by a raised central wall 60 such that embedded glass $E_1$ fed to channel 56 only overflows one outside wall of distributor 54 whereas embedded glass $E_2$ fed to channel 58 overflows the opposite sidewall of distributor 54. A further distributor 62, positioned below distributor 54, has a channel 64 which feeds embedded glass E downwardly over the opposed sidewalls of the channel. Finally, a distributor 66 positioned below distributor 62 has a channel 68 which feeds core glass C downwardly over the converging sidewalls of the distributor 66. Thus, channel 68 distributes core glass down opposed sides of distributor 66, channel 64 supplies a first layer of embedded glass E over the outer surface of both flows of core glass C, channel 56 of distributor 54 supplies a second embedded glass $E_1$ over the outer surface of one flow of first embedded glass E whereas channel 58 of distributor 54 supplies a further embedded glass $E_2$ over the surface of the other flow of embedded glass E, and finally channel 52 of distributor 50 supplies skin glass over the outer surfaces of embedded glasses $E_1$ and $E_2$ to form the seven layer composite 48 withdrawn from the bottom of distributor 66. FIG. 4 is merely illustrative of how various combinations of distributors may be positioned one above another, and it will be appreciated that the various combinations of distributors is virtually unlimited.

Figure 5:
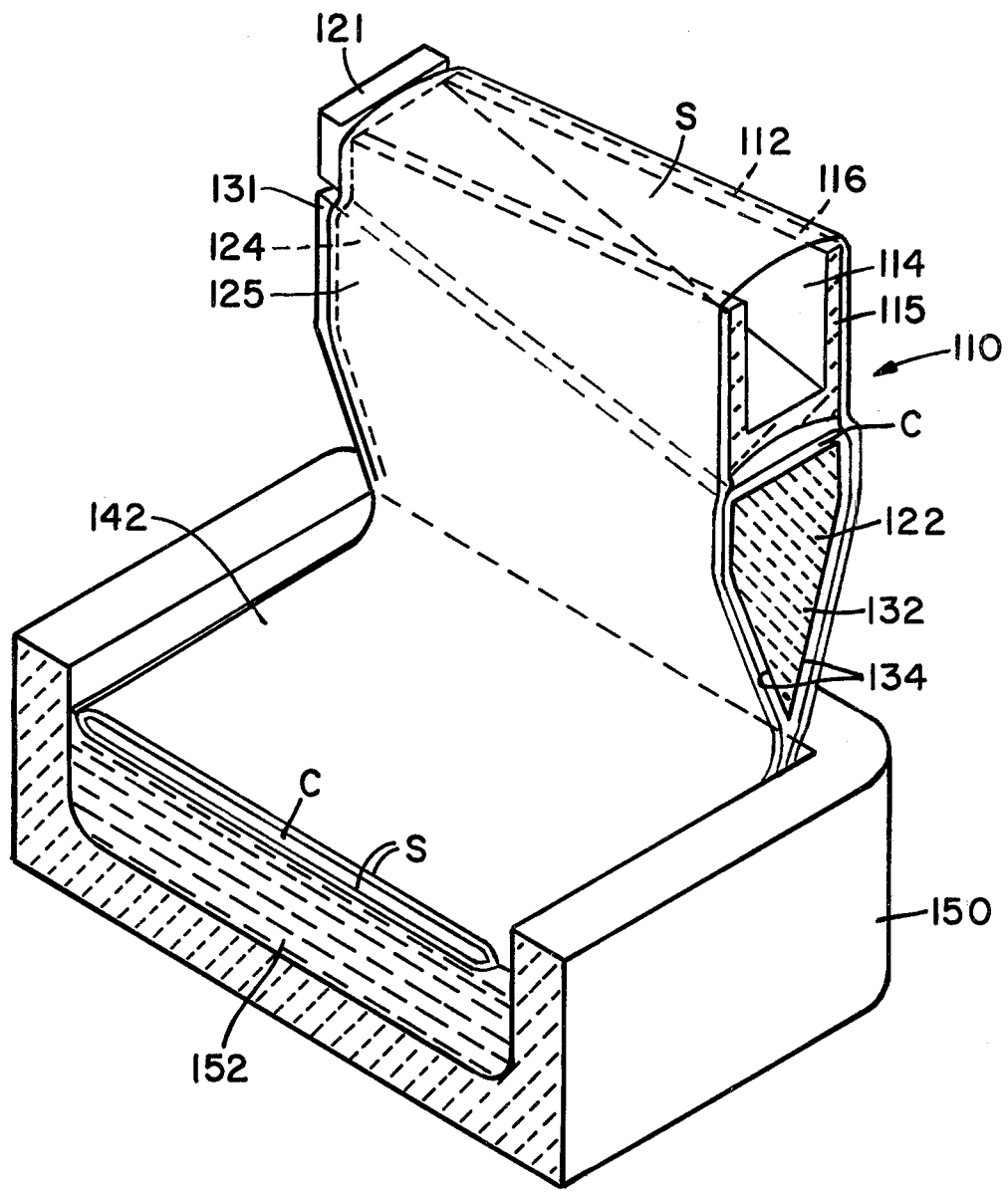
FIG. 5 is a somewhat schematic perspective view of a further embodiment of the invention relating to a specific application.

Referring now to FIG. 5, an alternative application of the laminated sheet glass forming apparatus of the present invention is shown as applied to a Float glass line. The apparatus 110 is similar to apparatus 10 shown in FIGS. 1 and 2, in that an upper distributor 112, having an overflow channel 114 bounded by sidewalls 115 and end dams 121, is supplied with a skin glass S which wells up and overflows the upper weir surfaces 116 and flows downwardly along the opposed outer sidewalls 115. In a like manner, a lower distributor member 122 is provided with an overflow channel 124, bounded by sidewalls 125 and end dams 131, such that a core glass C supplied to such channel, overflows the upper bounds of the sidewalls and flows downwardly along sidewalls 125 and downwardly converging forming surfaces 134 of the wedge-shaped sheet glass forming member portion 132. The laminated sheet 142 is withdrawn from the lower root portion of the forming wedge and deposited upon a bath of molten metal 152 retained within a conventional float tank 150.

The float process requires that the molten glass which is delivered to the molten metal bath must be compatible with the molten metal in which it is in contact for the duration of the thermal cycle which is required for the glass to achieve the desired degree of planarity. This requirement of the float process materially limits the glass compositions which can be utilized in the float process. However, by utilizing a soda lime glass composition, for which the float process was developed, for the skin layer that contacts the molten metal, it is possible to utilize glasses of special composition which are not compatible with the molten bath as a core glass and protecting the same by encapsulating it within molten metal compatible skin glasses of soda lime composition. Further, in order to preserve the cleanliness of the molten bath surface, a reducing or near reducing atmosphere is required, which also can be deleterious to various special glass compositions. Thus, such compositions can also be protected by laminating them as a core glass within a pair of skin glasses of soda lime composition utilizing the laminating process of the present invention. Thus, a core glass C which is not normally compatible with the float glass process, would be delivered by the distributor 122, whereas a skin glass of compatible soda lime composition would be distributed by distributor 115 so as to overflow the core glass and provide a laminate 142 delivered to the molten metal 152 having a sheet-like core C protected on its opposite sides by films of soda lime skin glass S.

In addition to the protection of a central specialty core glass for the float glass process, the present laminated sheet glass process may also be utilized for introducing a higher expansion core glass between two layers of lower expansion skin glass and thus provide a means of delivering a strengthened glass to a float glass process free of the optical streaks or "bull's-eyes" normally associated with the strengthening of soda lime glass by air chilling. Further, glass made by the float process has thickness limitations which are determined by the rheological properties of the glass composition and the molten bath used to obtain planar glass. By interposing a more viscous core glass layer between two layers of normal soda lime glass composition used in the float process, it would appear that a multiple layer composite glass could be delivered whose thickness may be an integral multiple of the equilibrium thickness of float glass manufactured by the usual single layer process.

As a specific example of one type of lamination, although by no means limiting in nature, a lower distributor member was provided having an overflow channel with a width 3.755", a depth at the inlet end of 5.302" and a length of 24". The bottom sloped up uniformly to its intersection with the upper weir or dam surfaces which were provided with an initial inclination or value of $\Theta$ of 4° below the horizontal. An upper distributor member was provided with an overflow channel which was 18" long, 2.373" wide and 3.156" deep at its inlet end. The upper dam or weir surfaces of the upper distributor were also inclined with an initial $\Theta$ value of 4° below the horizontal. The upper overflow channel was centered over the lower channel and glass was delivered to the respective channels at opposite ends as shown in the preferred embodiment of FIG. 1.

A soda lime core glass having a softening point temperature of 696° C. was delivered to the lower distributor at a rate of 140 pounds per hour at a temperature of 955° C. providing a viscosity of 30,000 poises. The core glass overflowed the distributor channel and flowed downwardly along the converging sidewalls of the forming wedge. A soft borosilicate skin glass having a softening point temperature of about 648° C. was delivered to the upper distributor at a flow rate of about 12 pounds per hour and at a temperature of 935° C. providing a viscosity of approximately 10,000 poises. The skin glass overflowed the upper distributor channel and downwardly over the outer surfaces of the downwardly flowing core glass whereupon a laminated sheet was withdrawn from the bottom of the forming member having a core of approximately 0.1" and a skin on each side thereof of about 0.01". The forming apparatus was tilted about an axis perpendicular to a vertical plane bisecting the upper and lower channels, in a clockwise direction with reference to FIG. 1, such that the operating weir angle or value of $\Theta$ for the upper skin glass weir surfaces was $5\frac{1}{2}°$, whereas the value of $\Theta$ for the lower core glass weir surfaces was $2\frac{1}{2}°$.

It will be appreciated that the sheet glass laminating process and apparatus of the present invention has many applications in addition to the lower expansion skin glass-high expansion core glass composite producing a strengthened article already disclosed; such as a photochromic skin glass over a clear, fixed tint or polarizing core glass, a durable skin glass over a nondurable core glass, a dissolvable skin glass over a durable core glass, a reducing skin glass over an oxidized metal containing core glass to obtain an internal film with infrared or visible light reflecting properties at the boundaries, and a multichromatic composition skin glass over an opal core glass.

Although we have set forth the now preferred embodiments of our invention, it will become apparent to those skilled in the art that various changes and modifications may be made thereto without departing from the spirit and scope thereof as defined in the appended claims.

We claim:

1. A method of forming laminated sheet glass which comprises, supplying a first molten glass of one composition to a first overflow channel, supplying a second molten glass of another composition to a second overflow channel, overflowing the first glass from said first channel into two separate downwardly converging sheet-like flow paths, overflowing the second glass from the second channel downwardly into two separate sheet-like flow paths and onto the outer surface of the downwardly flowing sheet-like paths of said first glass to form a pair of downwardly converging laminated flows while said glasses are in a molten condition, uniting said converging pairs of laminated flows into a single composite and drawing a sheet of laminated glass therefrom, and maintaining the outer surface of said second glass free from contact with distributing or forming means so as to provide a laminated glass sheet of fire polished quality.

2. A method of forming laminated sheet glass as defined in claim 1 including the steps of supplying at least one additional molten glass to a further overflow channel, overflowing the additional glass from said further channel into two separate sheet-like flow paths and onto the outer surface of the downwardly flowing sheet-like paths of said second glass to provide additional laminate flows while said glasses are in a molten condition.

3. A method of forming laminated sheet glass as defined in claim 1 including the steps of supplying a relatively fluid glass to said first overflow channel, supplying a devitrifiable glass to said second overflow channel at a viscosity greater than that of the relatively fluid glass supplied to said first overflow channel, and downwardly flowing said more viscous glass from said second overflow channel with a substantially slug flow pattern downwardly along the outer surface of the more fluid glass flow paths from said first overflow channel.

4. A method of forming laminated sheet glass as defined in claim 3 wherein the more fluid glass has a substantially laminar flow velocity with a maximum velocity adjacent to said more viscous glass and decreasing in velocity with increased distance from said more viscous glass.

5. A method of forming laminated sheet glass as defined in claim 1 including the steps of supplying the first molten glass to one end of said first overflow channel, and supplying the second molten glass to an end of said second flow channel which is opposite to the supply end of said first overflow channel.

6. A method of forming laminated sheet glass as defined in claim 1 or 5 which includes the steps of initially positioning longitudinal upper edge portions of each of said overflow channels at an angle relative to the horizontal, longitudinally tilting each said overflow channels to change the angle that the upper surfaces of each make with the horizontal so as to permit changes in glass flow rate and viscosity while maintaining substantially uniform flow from each channel.

7. A method of forming laminated sheet glass as defined in claim 6 including the step of tilting one of said overflow troughs so as to increase the angle which said longitudinal upper surfaces make with the horizontal and simultaneously tilting the other of said overflow channels so as to decrease the angle at which its longitudinal surfaces make with the horizontal thereby provides flexibility in the flow rates and viscosities of the glasses overflowing said channels while maintaining substantially uniform flow across the widths of the flow paths so formed.

8. A method of forming laminated sheet glass as defined in claim 1 including the step of feeding the drawn sheet of laminated glass to the surface of a molten metal bath and continuously moving such sheet across the surface of said bath.

9. Apparatus for forming laminated sheet glass which comprises, first overflow means for forming opposed sheetlike flows of molten glass having substantially uniform thickness across the width thereof, forming means positioned below said first overflow means for converging and uniting said opposed sheet-like flows into a single drawn sheet flow, second overflow means positioned above said first overflow means for overflowing second sheet-like flows of molten glass of substantially uniform thickness downwardly upon outer surfaces of said opposed sheet-like flows of said first overflow means, means for separately feeding molten glass to said first overflow means and said second overflow means, said first and second overflow means having longitudinally extending upper overflow surface portions, and means for longitudinally tilting said upper surface portions of said first and second overflow means with respect to the horizontal.

10. Apparatus for forming laminated sheet glass as defined in claim 9 wherein said first and second overflow means each comprises a longitudinally extending overflow channel having longitudinally extending upper overflow weir surfaces along each side of said channel and a glass delivery pipe communicating with an inlet end of each channel, and said upper overflow weir surfaces being substantially linear and extending from the inlet end at an angle below the horizontal.

11. Apparatus for forming laminated sheet glass as defined in claim 10 wherein the inlet end of one of said overflow channels is at an end of the channel opposite from the inlet end of the other of said channels, and the upper weir overflow surfaces of one of said overflow channels tapers downwardly below the horizontal from one side of said apparatus toward the other while the upper weir overflow surfaces of the other overflow channel taper downwardly below the horizontal from the other side of the apparatus toward said one side such that said means for tilting said upper surface portions increases the angle of tilt with respect to one of said channels and decreases said angle with respect to the other.

12. Apparatus for forming laminated sheet glass as defined in claim 9 which includes molten metal bath means for receiving upon the surface thereof the sheet flow drawn from said forming means.

* * * * *